Figure 1:
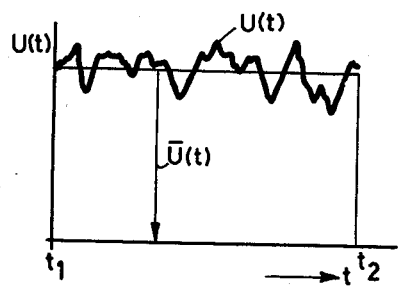

Aug. 18, 1964   E. FELIX   3,145,297
MEANS FOR AVERAGING A VARIABLE FUNCTION
Filed March 30, 1961

United States Patent Office 3,145,297
Patented Aug. 18, 1964

3,145,297
MEANS FOR AVERAGING A VARIABLE FUNCTION
Ernst Felix, Uster, Switzerland, assignor to Zellweger Ltd., Uster Factories for Apparatus and Machines, Uster, Switzerland, a corporation of Switzerland
Filed Mar. 30, 1961, Ser. No. 99,613
Claims priority, application Switzerland Apr. 8, 1960
3 Claims. (Cl. 235—183)

When evaluating variables, in particular statistical quantities, it often is desirable to determine the mean value of these quantities as accurately as possible. Accordingly, methods and means are known already which first convert the variable quantity to an equivalent electrical quantity and then form the mean value in an electrical way and manner under certain restrictions or approximately. In this connection may be mentioned, for example, a method in which the mean value is formed by carrying out an integration over a certain period and dividing the integral by the time interval, the mean value being formed arithmetically and found indirectly.

Another known method for finding the mean value in an approximate but direct way and manner is described in Patent No. 2,679,639. In this method an RC network is fed with a variable voltage, the approximate mean value being obtained at the output of the RC network after a certain oscillation or building-up period. This method has the disadvantage that owing to the exponential characteristic of the RC network the early test values do not have sufficient effect on the magnitude of the final test result. The longer the function duration in proportion to the time constant of the RC network, the smaller the proportion of the initial input values still present in the result. Finally, for very long durations a substantial further increase of the function duration affords practically no further gain in the statistical reliability of the measurement. This reliability, therefore, no longer corresponds to the statistical reliability theoretically attainable by the corresponding duration of the function.

It has also been proposed to lower the time constant of the RC network temporarily by manually actuating a switch, for example, so that the mean value, at least in coarse approximation, is obtainable, after only a short time. While the building-up time of the RC net may be shortened in this manner, the loss of statistical reliability remains for functions of extended duration. This manual interference with the time constant has the further disadvantage that the result of the measurement depends also to a very high degree on the duration of switching-in the smaller time constant.

It is the object of the present invention to overcome these disadvantages of prior systems.

In the present method for determining, to any desired degree of accuracy, the mean value of a variable function of any length desired and which is represented by an equivalent electrical quantity, the latter is applied to an RC network having a variable time constant which rises from a minimum value, and the mean value to be determined appears as an electrical voltage on the capacitor of the RC network.

The invention also comprises means for carrying out this method, including an RC network of which the time constant is variable and increases from a minimum value.

The method of the invention, as well as an embodiment of an averaging unit having a variable RC time constant are explained below with the aid of the following description and the drawing.

Figure 2:
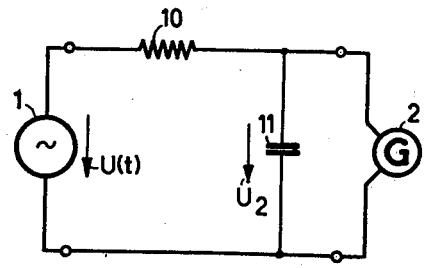
Figure 3:
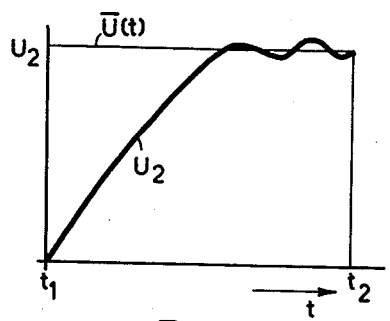
Figure 4:
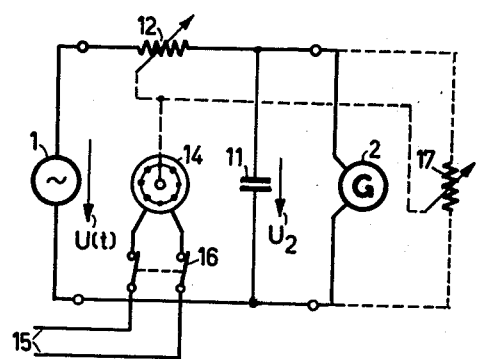
Figure 5:
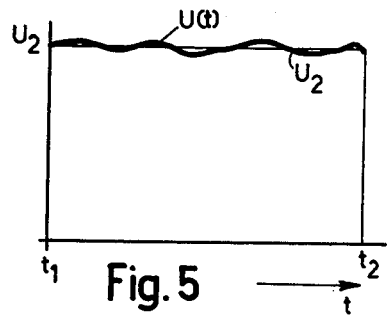
Figure 6:
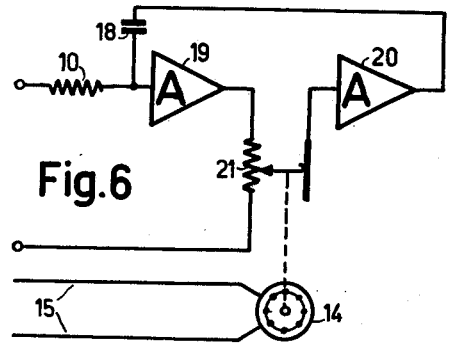

In the drawing:
FIG. 1 shows a variable function $U(t)$.
FIG. 2 depicts a simple RC network.
FIG. 3 shows the voltage curve at the output terminals of a simple RC network.
FIG. 4 illustrates an RC net having a variable time constant.
FIG. 5 shows the voltage curve at the output terminals of an RC net having a variable time constant.
FIG. 6 is a basic wiring scheme of an impedance circuit.

In FIG. 1 is shown as a function of the time $t$ a variable quantity $U(t)$ of which the mean value $\overline{U}(t)$ is to be determined over any length of time $t_2-t_1$.

In the simple RC network shown in FIG. 2, a generator 1 produces the variable electrical quantity $U(t)$. The output of the RC network is connected with a measuring device 2 which indicates the voltage $U_2$ built up across the capacitance of the RC network. It is assumed, for the time being, that the internal resistance of device 2 is infinite and that there is, therefore, no leakage resistance in parallel with the capacitor 11.

The output voltage $U_2$ of a simple RC network 10, 11 with any input voltage $U_1$ is, after solving the differential equation, valid for such an RC network $$U_2 = e^{-\int \frac{dt}{RC}} \left( K + \int \frac{U(t)}{RC} \cdot e^{\int \frac{dt}{RC}} dt \right) \quad (1)$$

in which K is an integration constant.

This voltage may represent the approximate mean value under certain restrictions such as transient period, of a limited portion of the input values in the final result. An example of such a voltage curve is shown in FIG. 3.

When the resistance R is varied in such a manner that $$\frac{dR}{dt} \cdot C = 1 \quad (2)$$

and $R=0$ when $t=0$, the following output voltage results:

$$U_2 = \frac{1}{t_2-t_1} \int_{t_1}^{t_2} U(t) \cdot dt \quad (3)$$

in which $t_1$ is the starting point, and $t_2$ is the end point of the interval under consideration.

This voltage corresponds to the accurate mean value of the electrical quantity $U_2$ over the entire length of function of evaluation from $t_1$ to $t_2$. By virtue of this solution, all the restrictions mentioned above are eliminated, and theoretically the maximum statistical reliability of the measuring result is obtainable.

FIG. 4 shows an averaging scheme which according to the invention represents a variable, automatically changing RC network. The latter is formed by a variable resistance 12 and a capacitor 11. The variable function $U(t)$ is applied from generator 1, and the mean value $U_2$ is indicated by the measuring device 2.

The value of resistance 12 may be varied by means of a mechanical transmission 13 driven by a motor 14 fed, for example, from a single-phase line 15 via a switch 16. Before starting an averaging operation, the minimum resistance value must be set as the initial position of the variable resistance 12. The mean value determination is started by closing switch 16 from which moment the motor 14 automatically raises the value of the variable resistance 12. If the loading effect of instrument 2 is not negligibly small, a further variable resistance 17 may be connected across instrument 2 and driven by the same motor 14 as indicated in FIG. 4 by dotted lines to compensate for the changes in the loading effect of the instrument.

In FIG. 5 is shown an example of the variations in the voltage across capacitor 11. In accordance with the invention, the time constant is chosen zero at the beginning of the mean value determination. Then, when the time constant is raised in accordance with the requirement set forth in Equation 2, it is unnecessary to wait for a building-up period since all the variations in the function, as they occur, are effective to the proper extent in determining the final mean value. $U_2$ thus always represents the accurate mean value of the voltage $U(t)$ from the point of origin $t_1$ to any point of time $t_2$. The accurate determination of the mean value of a variable function of any desired length is thereby insured.

The derivation according to the Equations 1 to 3 are valid for an RC network having only one variable resistance and a capacitor. The same result may also be obtained, however, with several resistances or capacitors if the equations are logically used. The practical realization of the averaging unit is relatively simple. For example, a potentiometer may be driven by a motor so that the resistance increases linearly with time, starting from zero at the beginning of the averaging period and in accordance with the curve defined by Equation 2. The changes in resistance, however, also may be made in other ways such as by thermal, optical or electronic means.

In place of conventional RC networks, impedance circuits such as the Miller integrator, may be used. The time constant in this case may be varied with time in any desired manner by changing the amplification instead of changing only the capacity or resistance.

In FIG. 6, for example, is shown schematically an impedance circuit in which the time constants are changed by regulating a variable resistance 21. The latter is inserted between two amplifying stages 19 and 20; the output of the second amplifying stage 20 is applied to the input of the first amplifying stage 19 through a capacitor 18. The position of the variable resistance 21 determines the degree of amplification in the second amplifying stage 20 whereby the apparent capacitance at the input of the first amplifying stage 19 is varied. The variable resistance 21 may be regulated by a motor 14 which is fed from a line 15 via switch 16. The variation with time of resistance 21 has to be such that the time constant is again raised according to Equation 2, taking into consideration the characteristic of the amplifying stages 19 and 20.

The advantage of such an impedance circuit is that since the magnitude of variable resistance 21 does not directly determine the time constant, its absolute resistance value is not critical.

In other cases it may be preferred, for practical reasons, to vary the resistance in discrete steps. The number and the fineness of the steps has to be determined in accordance with the accuracy desired.

A further possibility of varying the time constant of the RC network is to make the capacitance continuously or stepwise variable, instead of the resistance.

I claim:

1. In apparatus for determining the mean value of a variable function, the combination with a network including a capacitor and a resistor, a source of potential varying in accordance with the variations in the function connected to the capacitor through the resistor and means for measuring the potential across the capacitor, of means for automatically varying the time constant of the network independently of said potential and at a predetermined rate.

2. Apparatus according to claim 1 in which the means for varying the time constant includes a second resistor connected in parallel with the measuring means, and means for varying the second resistor to compensate for changes in the loading effect of the potential measuring means on the potential across the capacitor.

3. In combination, a source of potential varying in accordance with variations in a function, a resistor, an amplifier having an input circuit connected through the resistor to the potential source and an output circuit including a capacitor connected to the input circuit, a second source separate from and independent of said first-mentioned source, and means connected to said second source for automatically varying the gain of the amplifier to produce across the capacitor a potential varying in accordance with the cumulative mean value of the function.

References Cited in the file of this patent

UNITED STATES PATENTS

| | | |
|---|---|---|
| 2,586,803 | Fleming | Feb. 26, 1952 |
| 2,704,326 | Whitson et al. | Mar. 15, 1955 |
| 2,756,376 | Davis et al. | July 24, 1956 |